July 4, 1961 P. EYOLFSON 2,990,634
DIGGER TOOTH
Filed April 3, 1959
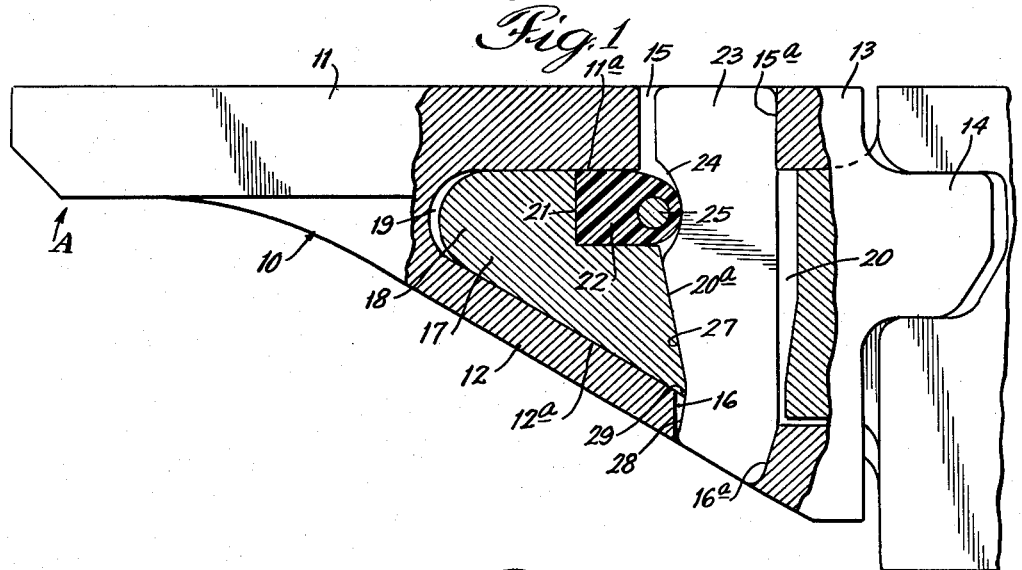
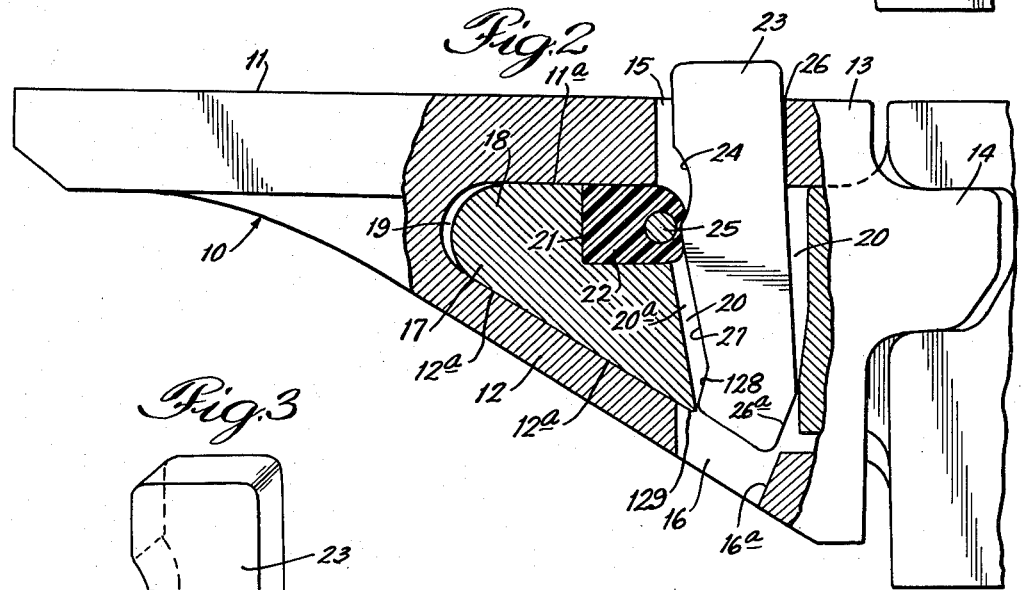
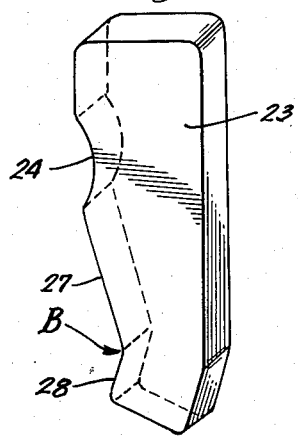
INVENTOR:
Paul Eyolfson,
BY Dawern, Titton, Fallon + Lungmus,
ATTORNEYS.

United States Patent Office

2,990,634
Patented July 4, 1961

2,990,634
DIGGER TOOTH

Paul Eyolfson, Portland, Oreg., assignor to Esco Corporation, a corporation of Oregon
Filed Apr. 3, 1959, Ser. No. 804,040
7 Claims. (Cl. 37—142)

This invention relates to a digger tooth, and, more particularly, to novel securing means for releasably securing the tooth parts together.

The type of tooth to which this invention has application includes those protruding elements employed on power dippers, dragline buckets, etc. In this form, the tooth includes an adapter element securable to the cutting edge of the earth excavating machine. This adapter is conventionally equipped with a forwardly-extending, wedge-shaped nose. Fitting over the nose is a socketed cap or point that is removable from the adapter nose upon wear for resharpening or replacement. Ordinarily, the point and adapter are locked together by a tapered retainer pin that extends through aligned openings in these elements.

The problem with these devices lies in trying to get as secure an attachment of the point to the adapter as is possible while still making the two readily disengageable. If they are too easily disassembled, disassembly may occur during digging. In many instances, the pin actually "squirts" out of the tooth. Then the adapter itself serves as the digging element. The adapter is not designed for this, not possessing the hardened, wear-resistant surface of the point. When a point is lost during operation, it is often not long before the adapter becomes useless.

This has indicated the need of achieving a very secure lock between the point and the adapter. However, if these two elements are secured together with means that can only be removed with difficulty, the overall machine operation is affected. Considerable time must be taken in such a case in order to remove the point, and this means valuable time lost because the machine cannot be employed. Also special tools may be required, and these are not always handy. As illustrative of this, the pins have been deformed at one end, generally the bottom, to provide a secure lock. When the tooth elements are to be disassembled, this necessarily entails special working in order to straighten the pin. Also, it means that a pin must be sufficiently ductile to permit this, which results in an overall weaker pin than one not needing such re-working in order to be removed.

It would, therefore, be desirable to provide a tooth locking structure that is characterized both by being a secure latching means but one also that is readily removable when desired and with a minimum of time and labor. For this, the locking structure must selectively resist dislodging shocks—remaining unaffected by tremendous shocks when the tooth is in use, but responding to a relatively light hammer blow when disassembly is indicated.

It is an object of this invention to provide a novel locking means for a point and adapter of the character described above. Another object is to provide a novel locking pin structure for a tooth point and adapter in which secure locking of the two elements is achieved, yet which permits ready disassembly. Still another object is to provide a tapered locking pin for maintaining a tooth point and adapter in assembled relation, yet which resists any operational stress tending to dislodge the pin itself. Yet another object is to provide a tooth possessing novel locking means that remain assembled despite harsh stresses ordinarily encountered in operation, but which yields to ready disassembly when needed.

A further object is to provide locking means for a tooth in which a combination of novel wedge and abutment surfaces makes possible superior locking under tremendous stresses but which submits to removal with a minimum of effort. Other objects and advantages of this invention can be seen as this specification proceeds.

The invention will be explained in conjunction with the accompanying drawing, in which—

FIG. 1 is an elevational view, partially in section, of a fragment of a tooth structure embodying teachings of this invention;

FIG. 2 is a view similar to FIG. 1 but which differs therefrom in showing the locking pin only partially installed in place; and FIG. 3 is a perspective view of a locking pin embodying teachings of this invention.

In the illustration given, the numeral 10 designates generally a cap or point for a tooth such as is conventionally employed on digging equipment. The point 10 includes a heavy metal top plate 11 constructed of a hardened, wear-resistant material and the tooth 10 is generally of the type seen in Baer Patent No. 2,483,032.

The remaining structure of the point 10 also parallels that seen in the above-mentioned Baer patent and includes a bottom wall 12 angularly disposed relative to the top wall 11 so as to provide therewith wedge faces 11a and 12a. The sides of the point are closed by vertically-extending side walls 13, which may be equipped with rearwardly-extending tongues 14, all of which is described in greater detail in the above-mentioned Baer patent.

The top wall 11 is equipped with a pin-receiving opening 15, while the bottom wall 12 is equipped with an opening 16 also intended for the receipt of a securing pin. As can be seen in FIGS. 1 and 2, the openings 15 and 16 are generally aligned so that a pin may be in bearing contact with the rear interior walls of both openings simultaneously, these walls being designated 15a and 16a, respectively.

The tooth includes an adapter 17 equipped with a wedge-shaped nose 18. The nose 18 has a length somewhat shorter than the horizontal dimension of the socket provided by walls 11, 12 and 13 of point 10 so as to provide a wear space 19 when inserted into the point 10. The nose 18 of adapter 17 is equipped with a vertically-extending opening 20 which is adapted to be generally aligned with the openings 15 and 16 in the top and bottom walls 11 and 12, respectively, of the point 10. The forward wall 20a of opening 20 in nose 18 is recessed as at 21 to provide a chamber for the receipt of a compressible plug 22. As will be explained in greater detail hereinafter, the plug 22 is operative to releasably lock a pin 23 in position within the aligned openings 15, 16, and 20. The pin 23 can also be seen in FIG. 3. In FIG. 2, the pin is seen in a partially inserted condition.

To provide the releasable lock effected by plug 22, the pin 23 is equipped with a notched-out portion 24 which permits the expansion of the plug 22 into a locking configuration. This occurs after the plug 22 has been compressed in the fashion seen in FIG. 2 and during the insertion of locking pin 23. Preferably, the plug 22 is equipped with a metal insert 25 which aids in maintaining the pin 23 in a locked condition as seen in FIG. 1.

The pin 23 is seen to be longitudinally tapered, with the lower end being narrower. In the illustration given, this is provided by a generally vertical flat rear wall 26 and a downwardly and inwardly tapered front wall 27. Only a portion of the front flat wall of pin 23 is tapered, this portion being intermediate the ends of the pin and providing the portion which is in bearing engagement with the rearwardly downwardly inclined forward wall 20a of opening 20, as can be best seen in FIG. 1. The upper portion of the rear wall 26 of pin 23 is in bearing engagement with the rear wall 15a of the opening 15 in the top wall 11 of point 10. The bottom portion of the rear wall 26 of pin 23 is in bearing engagement with the rear wall 16a of the lower opening 16 in point 10.

As can be seen in the drawing, the rear wall 16a of opening 16 is downwardly and inwardly inclined to provide a surface parallel with a correspondingly inclined portion 26a on the rear wall of pin 23. In one embodiment of the invention, the forward wall 27 of pin 23 extends at an angle of about 5° relative to the rear wall 26 thereof, while the portion 26a of rear wall 26 extends at an angle of about 15° relative to the remainder of the rear wall 26. Inasmuch as both walls 27 and 26a are inwardly and downwardly inclined, they thus are disposed at an angle of about 20° relative to each other. These walls thereby provide wedge surfaces cooperating with the bearing walls in openings 15 and 16, principally opening 16, to securely lock the pin in place against removal.

The lower portion of the front wall 27 of pin 23 is equipped with a projection 28, or, more properly, a change in direction of the frontal bearing surface. As seen in FIGS. 1 and 3, this projection is of a length, i.e., having a dimension measured longitudinally of pin 23, such that it can be hooked under the bottom rear portion of the nose 18, i.e., at the bottom of wall 20a—as at 29. In FIG. 2, the pin is seen to include a projection 128 of a length greater than the thickness of the lower wall 12, so that when the pin 23 of FIG. 2 is locked in place, there will be a portion of the projection overlapping the previously-mentioned lower end of the wall 20a which is designated in FIG. 2 by the numeral 129.

In either case, the projection operates in a novel manner to restrain the pin 23 against inadvertent removal or dislodgement, which might result from an upwardly-applied shock on point 10. With the structures described, any vertical force applied to the point 10 tends to accentuate the bearing contact between the pin 23 and the forward bearing surface thereof with wall 20a of nose 18.

Depending upon the character of the vertical force, the bearing contact between the rear wall 26 of pin 23 is increased with the rearward bearing in the point at either 15a or 16a, as the case may be. Without the projections 28 or 128, an upward force applies a squeezing force to the pin 23 and literally "squirts" the pin from its position in the aligned openings as seen in FIG. 1. With the provision of the projections 28 or 128, an effective lock under the bottom of the nose is provided that effectively resists this pin disassembly upon the imposition of a harsh shock to the bottom of point 10.

Pins identical in all respects with those shown except for the provision of projection 28 were tested in a guillotine-like structure wherein a 2000 pound drop weight was released from various heights to hit the lower wall 12 of the point 10 in a direction indicated by arrow A in FIG. 1 (the points being inverted from the condition seen in the drawing). A force applied in this manner would tend to rotate the point about the front edge of the nose and apply a forward pressure on the surface 16a. This can be considered the harshest test since it applies a maximum ejecting force on the pin. In 50 percent of the cases tried, the pins were either completely ejected or partially ejected and deformed in the range of 1500–2500 foot pounds. Using the same type of projection-lacking pins, but with the addition of grease covering thereto, virtually all pins were ejected when subjected to a force of 500–1500 foot pounds. In contrast to this, pins equipped with the hook-like projections seen in FIGS. 1 and 2 and designated respectively by the numerals 28 and 128, were similarly tested; none were ejected, even when heavily greased. With the structure shown in the drawing, all failures of the pins became shear failures, and at a minimum of 4000 foot pounds stress.

It is to be especially noted here that the size of the projection which might at first be considered to approximate a "hook" is relatively minor, so that in actuality it should not be considered to be performing in the manner normally anticipated from a hooking action. The so-called "hook" is only required to operate when the pressure on the bearing surfaces of the pin is at extremely high levels which are beyond the ability of the natural friction of the wedge-shaped pin to sustain. When the forward and rearward bearing surfaces are under heavy pressures, it is apparent that before the wedge could be ejected, the projection would have to be sheared off or flattened to a surface corresponding roughly to the frontal bearing surface of the wedge-shaped pin. I have found the most important section of the projection to be that portion where the front surface of the pin changes direction—as at B in FIG. 3. The effective portion of the projection may be in the range of $\frac{1}{16}''$ to $\frac{1}{8}''$ in length, depending upon the character of the metal of which the pin is composed. The projection may be of such small dimensions that it would appear as a bump on the pin front surface, the bump being longer in softer metal pins. As I see it, it is a matter of bringing another pressure plane into operation only when the pin is under heavy pressure from the surfaces 16a and 20a.

It is important to note that the structure is further advantageous in that when the pin is not under heavy pressures, it is still readily removed by reasonable blows of a punch and hammer.

Furthermore, I have found that the projection need not be a sharp projection or sharp hook, and, in fact, I have found that the structure operates entirely satisfactorily if the projection surface is almost parallel to the opposite wedge angle, i.e., the inclination of wall portion 26a. Further, it is not important that the hook be located at the exact edge of the forward bearing in the adapter nose. The alternative form of projection or hook is seen in FIG. 2. With this structure, it is apparent that the projection 128 is not hooked under the bottom edge of the adapter when the pin 23 is fully driven in. When the structure is used, the first operation is that the small projection 128 will be under such high localized bearing pressure that it will seat itself into the flat bearing surface of the nose. In other words, almost any irregularity in the general vicinity of the bottom edge of the nose bearing will form its own "seat" and will accomplish the purpose of eliminating the undesirable pin ejection.

In the illustration given, and using the angled walls of the pin as previously described, it is possible to make use of a much shorter pin to secure full bearing pressures. A common wedge is used in many applications, and it is generally necessary to hold the wedge angle very small, often as low as 1° or 2°, in order to provide a proper balance between friction and pressure angles to make the wedge self-locking. When this type of angle is required to lock the wedge in place, extreme care must be exercised in producing close tolerances in the fitting—necessitating considerable expense in the preparation, since a 1° angle surface is difficult to achieve. Further, an excessive length of wedge must be provided so that the wedge can be driven in to obtain a proper bearing, after which the protruding ends must be cut off.

With the inventive structure, the relatively short pin remains securely in place when the tooth is not under vertical stress. The wedge faces and the resilient plug are effective in promoting this. When, however, the tooth is subjected to upward shocks, the faces and plug would ordinarily be ineffective to retain the pin in place as was demonstrated in the guillotine tests previously referred to. Under these conditions, the improved pin provides a superior locking action in that the forward lower projection engages the lower forward edge of the nose opening, resulting in a locking action. This locking action positively resists pin removal—in its absence, the locking action of the plug and wedge faces can be readily overcome by relatively light hammer blows on the pin lower end, so that pin removal is a simple matter. The novel pin presented here has been found to be effective in resisting dislodgement under shock even when movement is not visible.

While in the foregoing specification, a detailed description of embodiments of the invention has been set forth for the purpose of explanation, many variations in the details given herein will be apparent to those skilled in the art without departing from the spirit and scope of the invention.

I claim:

1. In a digger tooth, a socket-equipped point having aligned pin-receiving openings in the top and bottom walls thereof, and adapter having a nose received in said socket with a vertically-extending opening in said nose aligned with said point openings, an elongated pin mounted in said openings in locking contact with the rear walls of said pin openings and the forward wall of said nose opening, said pin being longitudinally tapered to provide a smaller bottom end, said pin being equipped at its smaller end with an integral projection extending from the forward wall thereof, said projection, in the absence of upward stress on said point, being substantially out of locking engagement with both said point and said nose but upon imposition of upward stress on the point being in locking engagement with the lower forward wall portion of said nose opening, and resilient retainer means in said nose engaging said pin.

2. The structure of claim 1 in which said pin is equipped with opposite wedge faces at the lower end thereof, said faces being positioned forwardly and rearwardly of said pin, the lower point opening being equipped with the rear wall arranged to contact the rearward wedge face of said pin.

3. The structure of claim 2 in which said pin has downwardly converging flat front and rear walls to provide said taper, said rear wall being additionally inwardly tapered in the lower portion thereof to provide one of said wedge faces.

4. In an excavating tooth, a point comprising a wear-resistant top wall and a bottom wall related therewith to provide a wedge-shaped recess, an adapter equipped with a wedge-shaped nose received in said recess, said nose having a vertically-extending pin-receiving opening therein, said top and bottom walls each having an opening therein in alignment with said nose opening, each of said openings having generally flat front and rear walls, the front wall of said nose opening being downwardly rearwardly inclined, the rear wall of the opening in said bottom wall being downwardly forwardly inclined, an elongated pin having front and rear faces, the front face in a portion intermediate the ends thereof being downwardly and rearwardly inclined to engage the front wall of said nose opening, the rear face of said pin being downwardly forwardly inclined adjacent the bottom wall opening, the portion of said front face below said intermediate portion projecting forwardly to engage the bottom edge of said nose opening forward wall when an upward stress is applied to said point, and resilient locking means extending between said pin and adapter.

5. The structure of claim 4 in which said pin rear face and said rear wall of said bottom wall opening are arranged at an angle of about 15° to the vertical.

6. In an excavating tooth, a socket-equipped point having top and bottom walls each equipped with a pin-receiving opening, an adapter equipped with a socket-shaped nose received in the point socket, said nose having a vertically-extending, pin-receiving opening therein alignable with the point openings, each of said openings having generally flat front and rear walls, the front wall of said nose opening being downwardly and rearwardly inclined, the rear wall of the opening in said bottom wall being downwardly forwardly inclined, an elongated pin having front and rear faces, the front face in a portion intermediate the ends thereof being downwardly and rearwardly inclined to engage the front wall of said nose opening, the rear face of said pin being downwardly forwardly inclined adjacent the bottom wall opening to engage the rear wall of the bottom opening in the point, the portion of said pin front face below the inclined portion diverging forwardly from said inclined portion to engage the bottom edge of said nose opening forward wall when an upward stress is applied to said point, and resilient locking means extending between said pin and adapter.

7. For a tooth structure having a socket-equipped point removably received on an adapter nose, with a downwardly-tapered, vertically-extending opening in said nose and a pair of spaced-apart openings in said point aligned with the nose opening, an improved locking pin, comprising an elongated metal body having a length sufficient to extend substantially into said pair of openings, said pin being equipped with convergent forward and rear walls to define a longitudinal taper corresponding to said nose opening and equipped at its smaller end with a reverse taper positioned below said longitudinal taper, said reverse taper being adapted to be in bearing engagement with the rear wall of the lower point opening but being out of bearing engagement with said nose in the absence of an upward stress on said tooth structure, said reverse taper providing a forwardly-extending integral projection for engagement with said nose, and means on said pin for resiliently coupling said pin and adapter together.

References Cited in the file of this patent

UNITED STATES PATENTS

| | | |
|---|---|---|
| 1,172,813 | McCoy | Feb. 22, 1916 |
| 2,312,802 | Crawford | Mar. 2, 1943 |
| 2,674,816 | Daniels et al. | Apr. 13, 1954 |
| 2,702,490 | Launder | Feb. 22, 1955 |
| 2,846,790 | Davis et al. | Aug. 12, 1958 |
| 2,904,908 | Ratkowski | Sept. 22, 1959 |
| 2,949,687 | Peklay et al. | Aug. 23, 1960 |
| 2,951,300 | Ratkowski | Sept. 6, 1960 |

FOREIGN PATENTS

| | | |
|---|---|---|
| 27,698 | Great Britain | Dec. 17, 1903 |
| 565,417 | Great Britain | Nov. 9, 1944 |